(12) United States Patent
Hirata et al.

(10) Patent No.: US 6,424,393 B1
(45) Date of Patent: Jul. 23, 2002

(54) LIQUID CRYSTAL DISPLAY APPARATUS

(75) Inventors: Mitsuaki Hirata, Nara; Fumikazu Shimoshikiryoh, Tenri; Shigeaki Mizushima, Ikoma; Mitsuaki Morimoto; Tazo Ikeguchi, both of Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/940,424

(22) Filed: Aug. 29, 2001

(30) Foreign Application Priority Data

Aug. 30, 2000 (JP) .................................. 2000-260345

(51) Int. Cl.$^7$ .................................. G02F 1/3335
(52) U.S. Cl. .................................. 349/106; 349/155
(58) Field of Search .................................. 349/106, 155

(56) References Cited

U.S. PATENT DOCUMENTS 6,141,078 A * 10/2000 Morii et al. ............... 349/155

FOREIGN PATENT DOCUMENTS

| JP | 2-15241 A | 1/1990 |
| JP | 4-204417 A | 7/1992 |
| JP | 2001-5009 A | 1/2001 |
| JP | 2001-13504 A | 1/2001 |

* cited by examiner

*Primary Examiner*—Kenneth Parker
*Assistant Examiner*—David Chung
(74) *Attorney, Agent, or Firm*—Nixon & Vanderhye, P.C.

(57) ABSTRACT

An object of the invention is to provide a high-contrast liquid crystal display apparatus which is excellent in display quality, with its substrates equally spaced with high accuracy. On a first and a second substrate are formed a color filter of three colors: red, green, and blue, electrodes for applying a voltage to a liquid crystal layer, orientation film layers for orienting liquid crystal, a pair of polarizing plates arranged in a crossed Nicol state, a TFT element, and a wire (not shown). The substrates are bonded together with spherical spacers interposed therebetween, thereby constituting the liquid crystal layer. Then, the spherical spacers are selectively placed in the color filter regions of red- and blue-color.

8 Claims, 6 Drawing Sheets

LIQUID CRYSTAL DISPLAY APPARATUS

BACKGROUND OF THE INVENTION

1. Field of the Invention

The present invention relates to a liquid crystal display apparatus for use as a monitor display in a computer and for displaying a video image or the like, and more particularly to a liquid crystal display apparatus which is excellent in display quality and visual angle characteristics.

2. Description of the Related Art

White/black display brightness contrast (hereafter simply referred to as "contrast") is relevant to the display quality of a liquid crystal display apparatus. Causes of degrading the contrast include a phenomenon in which light leaks through spherical spacers or through the vicinity thereof when a black color is displayed. As techniques to eliminate degradation of contrast due to such a light-leakage phenomenon, for example, a liquid crystal display apparatus disclosed in Japanese Unexamined Patent Publication JP-A 2-15241 (1990), a method for manufacturing a liquid crystal display panel disclosed in Japanese Unexamined Patent Publication JP-A 4-204417 (1992), and others are known.

The liquid crystal display apparatus disclosed in JP-A 2-15241 comprises a thin-film transistor substrate including a substrate and thin-film transistor arrays arranged in a matrix form thereon, and a counter electrode substrate including a transparent substrate, and a transparent counter electrode and a transparent insulating film formed on a transparent substrate. In this construction, a gap between the thin-film transistor substrate and the counter electrode substrate is defined with conductive columns formed on source electrode lines of the transistors by vapor-deposition, sputtering or the like. On the other hand, in the method for manufacturing a liquid crystal display panel disclosed in JP-A 4-204417, spacer particles are positively or negatively charged, the transparent electrode formed on a glass substrate is given the same pole as that of the spacer particle, and the spacer particles are dispersed. In this way, by forming and dispersing spacers on the underside of a light-shielding material, such as a metal wire, an active element, or a black mask, or on a pattern gap, i.e., a region other than the display electrode region, it is possible to prevent occurrence of light leakage due to a spacer.

However, the liquid crystal display apparatus disclosed in JP-A 2-15241 and the method for manufacturing a liquid crystal display panel disclosed in JP-A 4-204417 have the following disadvantages. The former requires a column forming process, and, in this regard, unevenness in the heights of columns inconveniently causes a gap between the substrates to become uneven. This makes it difficult to realize a liquid crystal display apparatus in which the substrates are equally spaced with high accuracy. The latter requires a light-shielding portion to have an area large enough to disperse spherical spacers. This accordingly imposes a restriction on the size of the opening portion excluding the light-shielding portion. Consequently, it is difficult to increase the transmittance of the liquid crystal display apparatus.

Moreover, there arises another problem. Due to the wavelength-dependent property existing in the spectral characteristics of a polarizing plate, liquid crystal, a phase difference plate, and other materials, the black display of a liquid crystal display apparatus is tinged with blue. Since the bluish tint occurs only in black display, there is a problem that if color adjustment is performed to solve this bluish tint problem, the color of white display also varies.

Furthermore, in a liquid crystal display apparatus with a wide viewing angle comprising: a liquid crystal layer having a display picture element region including a first and a second region having mutually different liquid crystal molecule orientations; and a phase difference compensating element for compensating for, in a state where no voltage is applied, the refractive index anisotropy of the liquid crystal molecules aligned substantially parallel to the substrate surface, light leakage due to a spherical spacer is more notable and the bluish tint of black display is deeper than in a common twisted nematic mode construction.

SUMMARY OF THE INVENTION

An object of the invention is to provide a liquid crystal display apparatus offering high contrast and excellent display quality, with its substrates equally spaced with high accuracy.

The invention provides a liquid crystal display apparatus comprising:

a first and a second substrate, of which at least one is transparent;

color filters of a plurality of colors formed on at least one of the substrates;

a spacer for defining a gap between the first and second substrates, wherein a density of spacers existing in a color filter region of any one of the colors is lower than a density of spacers existing in a color filter region of at least one of remaining, colors.

According to the invention, the density of the spacers existing in the color filter region of any one of the colors is lower than that of the spacers existing in the color filter region of the at least one of remaining colors. This arrangement helps prevent occurrence of light leakage due to the spacer and thus makes it possible to keep the brightness of black display low and to improve the contrast.

As described heretofore, according to the invention, light leakage due to a spacer can be successfully prevented. This makes it possible to keep the brightness of black display low, to allow substrates to be equally spaced with high accuracy, to obtain higher transmittance, and to improve the contrast.

The invention further provides a liquid crystal display apparatus comprising:

a first and a second substrate, of which at least one is transparent;

a color filter of a plurality of colors formed on at least one of the substrates;

a liquid crystal layer contained between the first and second substrates; and a spacer for defining a gap between the first and second substrates, wherein, in the liquid crystal layer, display picture element regions have at least two regions which have mutually different liquid crystal molecule orientations, and wherein a density of spacers existing in a color filter region of any one of the colors is lower than a density of spacers existing in a color filter region of at least one of remaining colors.

According to the invention, there is provided a liquid crystal layer in which display picture element regions have at least two regions having mutually different liquid crystal molecule orientations. Moreover, the density of spacers existing in the color filter region of any one of the colors is lower than the density of spacers existing in the color filter region of at least one of remaining colors. This arrangement makes it possible to attain wide-angle-view characteristics and to prevent occurrence of light leakage due to a spacer. Consequently, the brightness of black display is kept low and the contrast is improved.

Further, according to the invention, wide-angle-view characteristics are attained and occurrence of light leakage due to a spacer can be prevented. This makes it possible to keep the brightness of black display low, to allow substrates to be equally spaced with high accuracy, to obtain higher transmittance, and to improve the contrast.

Further, in the invention, it is preferable that a density of spacers existing in a color filter region of a color having higher visibility for human eyes is lower than a density of spacers existing in a color filter region of a color having lower visibility for human eyes.

According to the invention, the density of spacers existing in the color filter region of a color having higher visibility for human eyes is lower than the density of spacers existing in the region corresponding to a color having lower visibility for human eyes. This helps prevent light leakage due to a spacer from occurring in light of a color having higher visibility for human eyes, and thereby keep the brightness of black display low and improve the contrast.

In the invention, it is preferable that the color filters are of three colors: red, green, and blue, and that a density of spacers existing in a color filter region of green-color is lower than a density of spacers existing in a color filter region of red- or blue-color.

According to the invention, the density of spacers existing in the color filter region of green-color is lower than the density of spacers existing in the color filter region of red- or blue-color. This helps prevent light leakage due to a spacer from occurring in green light having higher visibility for human eyes, and thus keep the brightness of black display low and improve the contrast.

Further, according to the invention, light leakage due to a spacer is prevented from occurring in green light having higher visibility for human eyes. This makes it possible to keep the brightness of black display low and to improve the contrast.

In the invention, it is preferable that the color filters are of three colors: red, green, and blue, and that a density of spacers existing in a color filter region of green- or blue-color is lower than a density of spacers existing in a color filter region of red-color.

According to the invention, the density of spacers existing in the color filter region of green- or blue-color is lower than the density of spacers existing in the color filter region of red-color. This helps prevent light leakage due to a spacer from occurring in green light having higher visibility for human eyes under photopic conditions of vision and in blue light having higher visibility for human eyes under scotopic conditions of vision. Consequently, the brightness of black display is kept low, the contrast is improved, and a bluish tint is suppressed.

Moreover, according to the invention, it is possible to prevent light leakage due to a spacer from occurring in green light having higher visibility for human eyes under photopic conditions of vision and in blue light having higher visibility for human eyes under scotopic conditions of vision. Consequently, the brightness of black display is kept low, the contrast is improved, and a bluish tint is suppressed

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
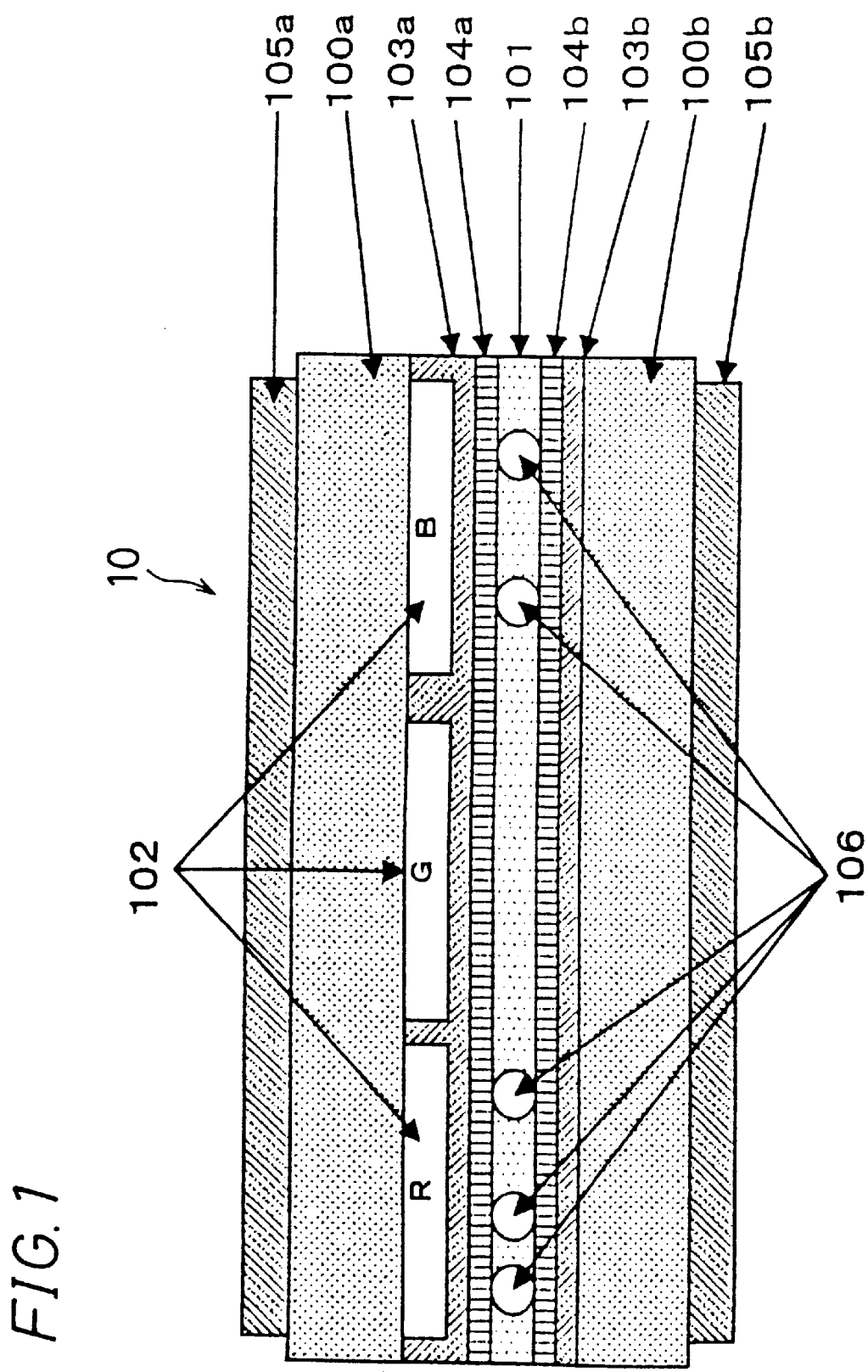
FIG. 1 is a sectional view illustrating the structure of a liquid crystal display apparatus 10 of an embodiment of the invention.

Now referring to the drawings, preferred embodiments of the invention are described below.

FIG. 1 is a sectional view illustrating the structure of a liquid crystal display apparatus 10 of an embodiment of the invention. The example shown in FIG. 1 is a light transmission-type TFT (Thin Film Transistor) active matrix liquid crystal display apparatus in a twisted nematic mode.

Note that the display mode employed in the liquid crystal display apparatus of the invention is not limited to the twisted nematic mode. For example, it is possible to employ instead an ECB (Electrically Controlled Birefringence) mode, a vertical orientation mode, a transverse electric field mode, a high molecular dispersion liquid crystal mode, an OCB (Optically self-Compensated Birefringence) mode, or any other liquid crystal display mode in which the action of liquid crystal is controlled by an electric field. Note also that the active element is not limited to a TFT but may be a diode, that the driving method is not limited to an active driving method but may be a duty driving method, and that the display pattern may be either a reflection or a semi-reflection pattern.

The liquid crystal display apparatus 10 is provided with: a first and a second substrate 100a and 100b, of which at least one is transparent; a liquid crystal layer 101; a color filter 102 of several colors formed on the first substrate 100a; electrodes 103a and 103b for applying a voltage to the liquid crystal layer 101; orientation film layers 104a and 104b for orienting liquid crystal; a pair of polarizing plates 105a and 105b arranged in a crossed Nicol state; a TFT element; and a wire (not shown). The thickness of the liquid crystal layer 101 is defined by a spherical spacer 106 sandwiched between the substrates 100a and 100b.

Note that, to improve the display quality and reliability, in addition to the above stated constituent elements, for example, a phase difference plate (a phase difference compensation film, a liquid crystal cell, or any other element may be used instead as long as it offers adequate refractive index anisotropy) may be disposed inside the polarizing plates 105a and 105b. Moreover, additional arrangement of a planarizing film for planarizing the color filter, alight-shielding mask, or the like is possible.

In this embodiment, the color filter 102 is of three colors: red, green, and blue. The spherical spacers 106 are placed only in the color filter regions of blue- and red-color and are not placed in the color filter region of green-color, or are placed therein slightly, if any.

Figure 3:
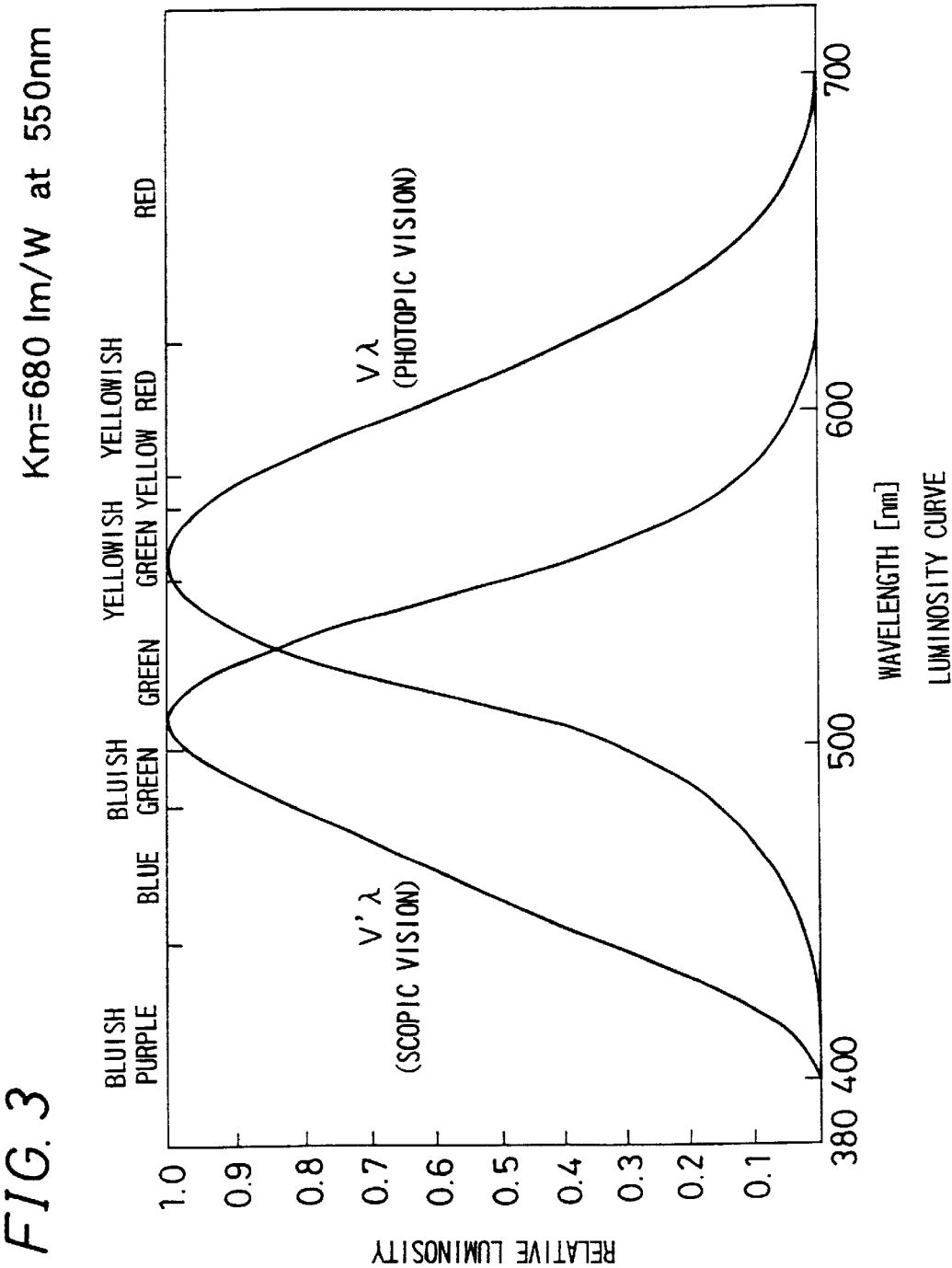
FIG. 3 shows luminosity curve which indicates the relationship between the relative luminosity of human eyes and the wavelength of light.

The contrast of a liquid crystal display apparatus is defined by the ratio of the brightness of white display to the brightness of black display. The brightness is expressed as a value corresponding to the relative luminosity characteristic of human eyes. FIG. 3 shows a luminosity curve which indicates the relationship between the relative luminosity of human eyes and the wavelength of light. As will be understood from the curve depicted in the figure, the light of 500 nm in wavelength, which corresponds to green light, has the highest visibility for human eyes.

A liquid crystal display apparatus customarily employs a color filter of three colors: red, green, and blue. From the standpoint of the relative luminosity of human eyes, it can be considered that the contrast of a liquid crystal display apparatus depends mainly on the transmission characteristics of the color filter region of green-color.

Accordingly, by making the density of spacers, i.e., the number of spacers per unit area, existing in the color filter region of green-color lower than the density of spacers existing in the color filter region of red- or blue-color, it is possible to prevent light leakage from occurring in the color filter region of green-color and thus achieve contrast that is substantially equal to the contrast obtained when no spherical spacer exists.

Also in a case where a color filter of different colors than red, green, and blue, for example, a color filter of white, which serves to increase brightness, cyan, magenta, and yellow is used, based on the similar theory, by decreasing the density of spherical spacers existing in the color filter region of a color corresponding to approximately 550 nm in wavelength, the contrast is improved.

Moreover, eliminating spherical spacers from the color filter region of blue-color helps suppress a bluish tint that occurs in the black display due to the existence of wavelength-dependent property in the spectral characteristics of a polarizing plate, liquid crystal, a phase difference plate, and other materials. In addition, as seen from the relative luminosity observed under photopic conditions of vision shown in FIG. 3, at a dark place, human eyes are particularly sensitive to a blue color. Therefore, eliminating spherical spacers from the blue-color region allows the advantage of the invention to become more evident.

Next, the invention will be described below in detail by way of embodiments.

(Embodiment 1)

The substrates 100a and 100b are built as a counter electrode substrate and an active element substrate, respectively. The counter electrode substrate 100a employed in this embodiment is of similar construction to a conventional one on which a color filter 102 of three colors RGB (red, green, and blue) is formed in the shape of a stripe. Note that a delta arrangement may be adopted here for the color filter, or the color filter may be formed on the active element substrate. On the color filter 102 is formed a transparent electrode made of ITO (Indium Tin Oxide). Although the active element substrate 100b employed in the embodiment has basically the same structure as that of conventional ones, it needs to be designed as follows. Like a conventional active element substrate, on the substrate is formed a TFT acting as an active element, signal lines that correspond to their respective colors R, G, and B, and a scanning line. To examine defects found in the active element substrate or in the conditions of the liquid crystal display apparatus, the three signal lines corresponding to their respective colors R, G, and B of the color filter 102 are individually short-circuited outside the active area, and, after being subjected to examinations, the short-circuit lines are cut off.

On the two substrates are formed orientation films 104a and 104b for orienting liquid crystal. To control the orientation, rubbing treatment is conducted therefore.

Now, a description will be given below as to a placement method for selectively placing the spherical spacer 106 on the active element substrate 100b. A negative potential is imposed on the signal line corresponding to the green color of the color filter 102, a positive potential is imposed on the signal line corresponding to the other color thereof, and a positive potential is imposed on the scanning line. Material designing and the setting of dispersion condition for the spacer are determined such that the surface potential of the spherical spacer 106 to be dispersed is negatively charged. Consequently, by dint of Coulomb force, the spherical spacers 106 are selectively placed in the red- and blue-color regions.

A picture element, acting as a display region, generally has a width of about 100 μm. Even the smallest one has a width in the range of 30 to 40 μm. Therefore, the spherical spacers 106a are selectively placed with ease by the above stated dispersing method. Moreover, where the opening ratio is increased to 80%, assuming that the width of the picture element is 100 μm, the width of the light-shielding portion lying between adjacent picture elements is set at no greater than 10 μm. In this case, selective placement of the spacer in the light-shielding portion is difficult by the prior art method. However, with the technique underlying the invention, the spherical spacers 106 can be placed in the red- and blue-color regions. This makes it possible to keep the opening ratio greater than 80%, thereby achieving sufficiently high transmittance.

Note that, in connection with the above stated potential setting, it is essential only that the surface potential of the signal line corresponding to a color region where no spherical spacer 106 is intended to be placed and that of the spherical spacer 106 have the same sign. More specifically, when the spherical spacer 106 is positively charged, a negative potential is imposed on the scanning line and the signal line corresponding to a color region where the spherical spacer 106 is intended to be placed, and a positive potential is imposed on a picture element corresponding to a color region where no spherical spacer 106 is intended to be placed.

Moreover, for the dispersion of the spherical spacers 106, the embodiment employs a method of applying an electrical charge and exploiting Coulomb force. However, any other method may be employed instead, for example, either a method whereby, after the dispersion of the spacers, only those existing in the targeted area are removed or a method whereby, after the spacers to be left are bonded to the surface of the substrate, only those existing in the targeted area are removed by air-blowing or other means, or a combination of these methods.

Figure 6A:
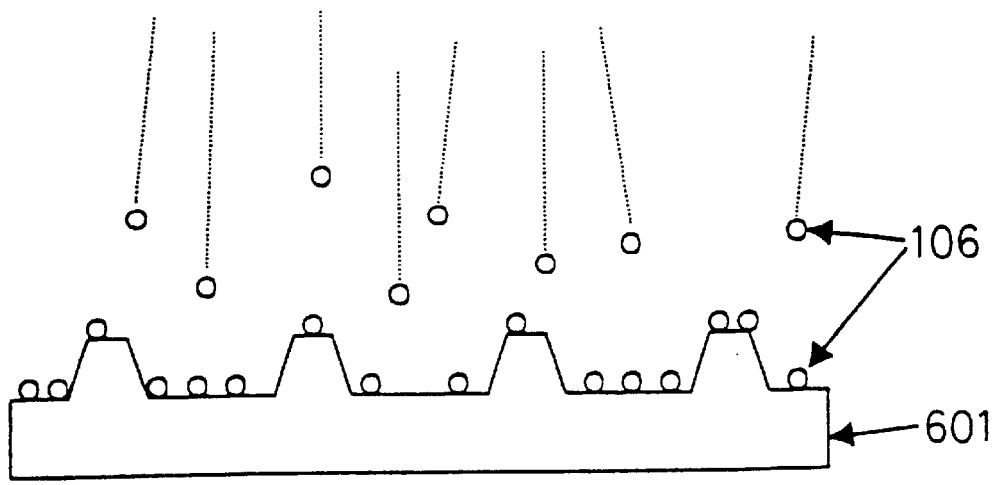
FIGS. 6A to 6C are views showing a transfer-based placement method for a spherical spacer 106.
Figure 6B:
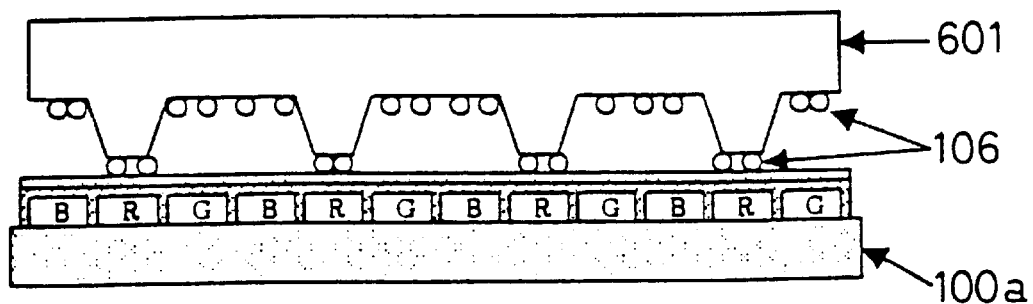
Figure 6C:
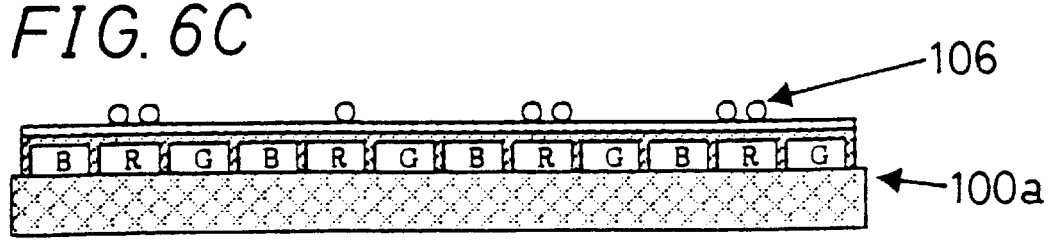

As another method for placing the spherical spacer 106, there is known a transfer-based method as shown in FIGS. 6A, 6B, and 6C. Firstly, the spherical spacers 106 are dispersed on a transfer plate 601 provided with a projection having a pitch equal to the pitch of the color filter 102 of one and the same color (see FIG. 6A). Secondly, the projection of the transfer plate 601 is aligned with the region of the counter electrode substrate 100a where the spherical spacers 106 are intended to be placed, thereby bringing the transfer plate 601 into contact with the counter electrode substrate 100a (see FIG. 6B). Lastly, the transfer plate 601 is detached from the counter electrode substrate 100a, and as a result the spherical spacers 106 are placed by transfer in any given region of the counter electrode substrate 100a (see FIG. 6C).

At the time when the spherical spacers 106 are dispersed on the transfer plate 601, by charging the projection and the spherical spacer 106 so that they have different signs, the spherical spacers 106 can be effectively collected in the projection of the transfer plate 601. However, this can be achieved without the charging.

In any of the above stated methods, in order for the spherical spacers 106 to be securely fixed to the substrate, it is preferable to use such spherical spacers as exhibit adhesion properties by heat or light application with respect to a substrate.

In this way, after the spherical spacers 106 are selectively placed in the red- and blue-color regions, the two substrates are bonded together, and then a liquid crystal material is injected therein to. Upon completion of sealing of the inlet, examinations for the panel and a cut-off process for the aforesaid short circuits used for examinations are conducted. Thereafter, the polarizing plates 105a and 105b are bonded together and the periphery circuits are mounted, and eventually the liquid crystal display apparatus 10 is realized.

According to the embodiment, a 10% improvement of the contrast is achieved.

(Embodiment 2)

Figure 2:
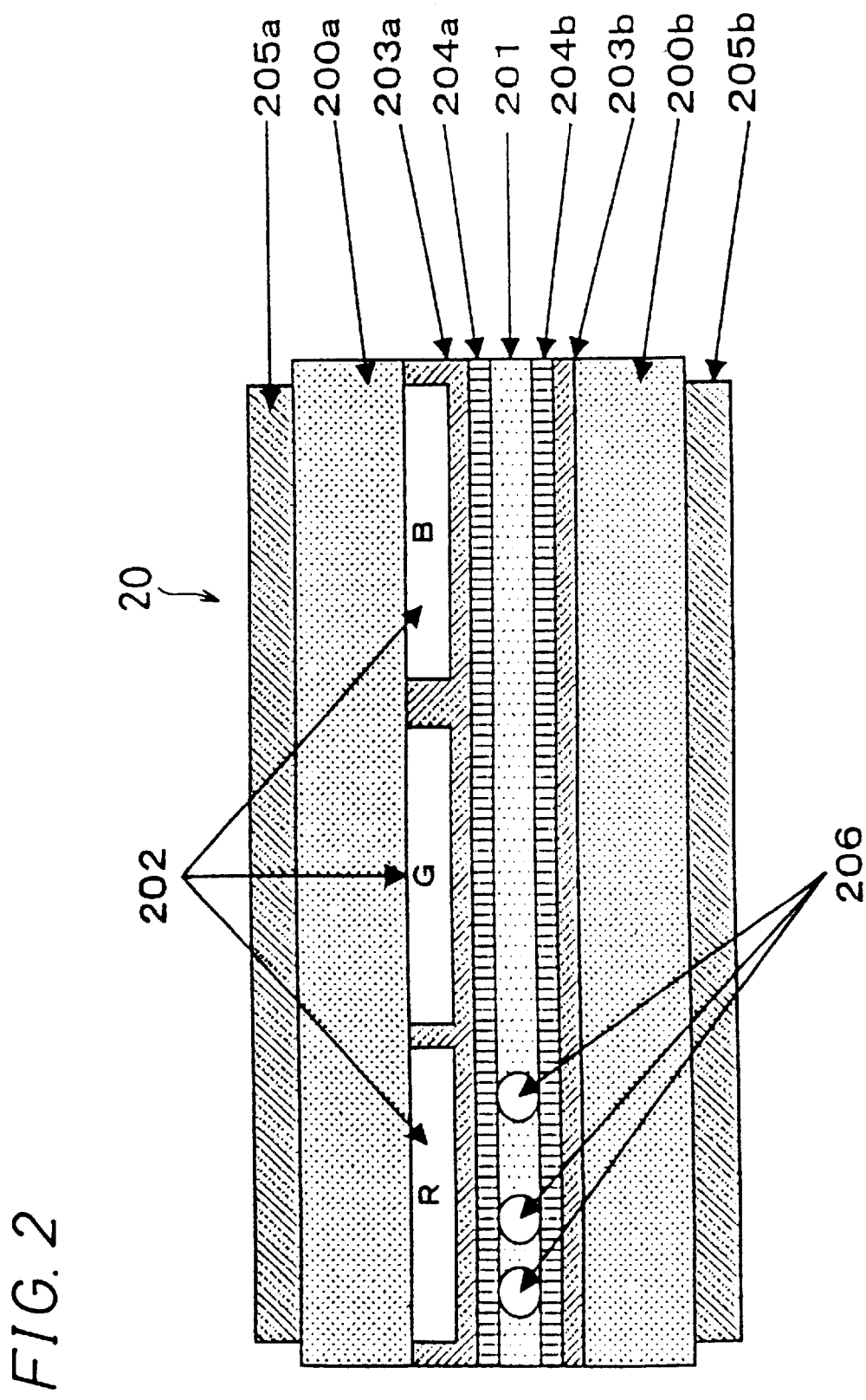
FIG. 2 a sectional view illustrating the structure of a liquid crystal display apparatus 20 of the embodiment of the invention.

As another embodiment, a construction is shown in FIG. 2 wherein spherical spacers 206 are placed only in the red-color region. A liquid crystal display apparatus 20 is, like the liquid crystal display apparatus 10, provided with: a first and a second substrate 200a and 200b; a liquid crystal layer 201; a color filter 202 of a plurality of colors formed on the first substrate 200a; electrodes 203a and 203b for applying a voltage to the liquid crystal layer 201; orientation film layers 204a and 204b for orienting liquid crystal; a pair of polarizing plates 205a and 205b arranged in a crossed Nicol state; a TFT element; and a wire (not shown). The thickness of the liquid crystal layer 201 is defined by a spherical spacer 206 sandwiched between the substrates 200a and 200b.

The liquid crystal display apparatus 20 of this embodiment is manufactured based on a method similar to that adopted in the embodiment 1.

In this embodiment, it is possible to prevent light leakage from occurring only in the red-color region which has lower luminosity under either photopic or scotopic conditions of vision. As a result, there is provided a high-contrast liquid crystal display apparatus 20 in which no tint was perceived in the black display under subjective evaluation.

Figure 4:
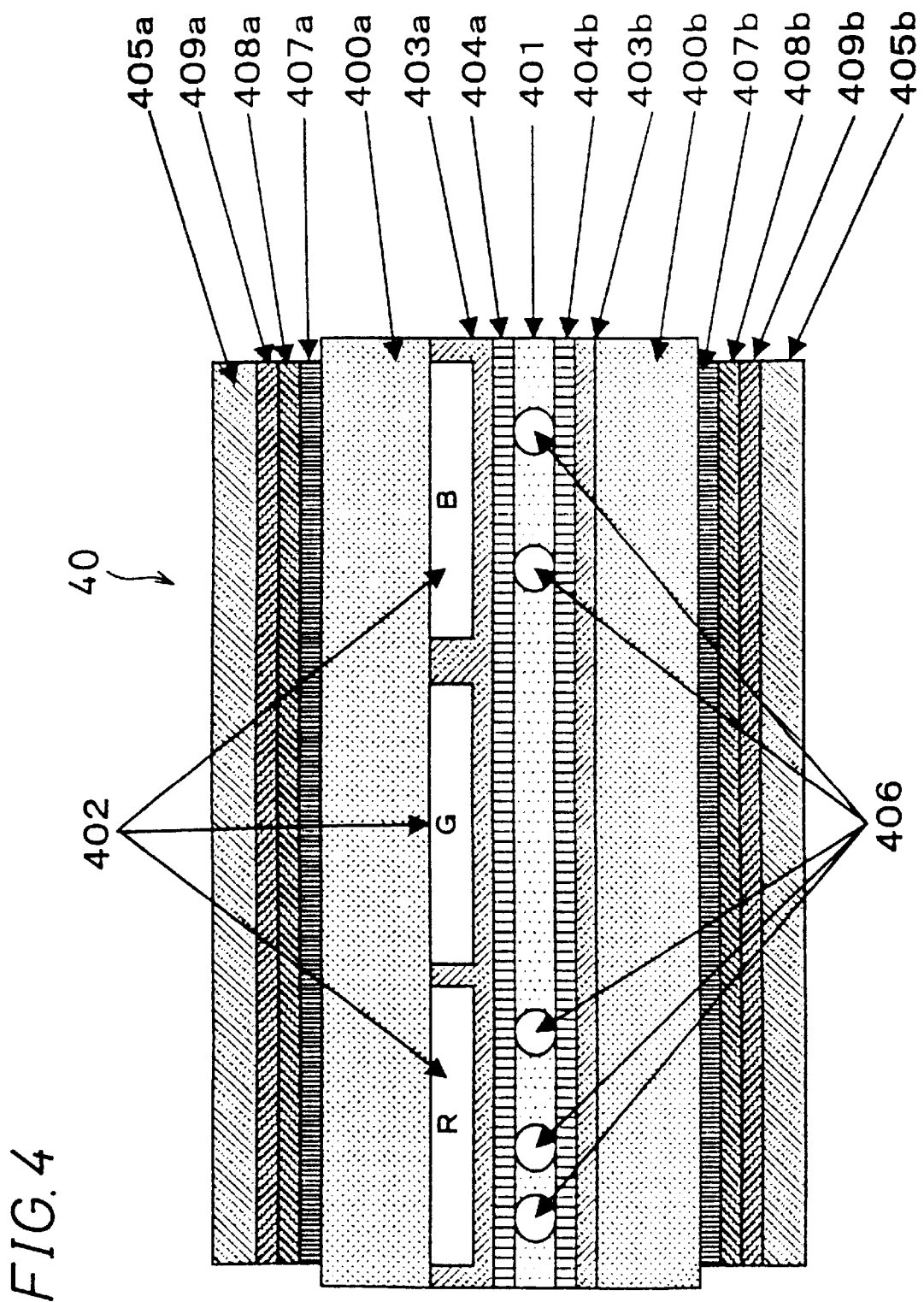
FIG. 4 is a sectional view illustrating the structure of a liquid crystal display apparatus 40 of another embodiment of the invention.

FIG. 4 is a sectional view illustrating the structure of a liquid crystal display apparatus 40 of another embodiment of the invention.

The liquid crystal display apparatus 40 is provided with: a first and a second substrate 400a and 400b, of which at least one is transparent; a liquid crystal layer 401 sandwiched between the first and second substrates 400a and 400b, the liquid crystal layer being made of a nematic liquid crystal material having positive dielectric anisotropy; a color filter 402 of a plurality of colors formed on at least one of the substrates; a first and a second electrode 403a and 403b disposed in the first and second substrates 400a and 400b, respectively, for applying to the liquid crystal layer 401 an electric field which is substantially perpendicular to the first and second substrates 400a and 400b; orientation film layers 404a and 404b for orienting liquid crystal; a first and a second polarizing plate 405a and 405b disposed on the outer sides of the first and second substrates 400a and 400b, respectively, the polarizing plates being arranged in a crossed Nicol state; phase difference compensating elements 407a and 407b (a phase difference compensation film, a liquid crystal cell, or any other element may be used instead as long as it offers adequate refractive index anisotropy) disposed on the inner sides of the polarizing plates 405a and 405b, respectively; and phase difference compensating elements 408a/409a and 408b/409b disposed on the outer sides of the phase difference compensating elements 407a and 407b, respectively.

Note that the phase difference plates 407a, 407b, 408a, 408b, 409a, and 409b may be omitted, or used singly or in combination.

The thickness of the liquid crystal layer 401 is defined by a spherical spacer 406 sandwiched between the substrates 400a and 400b.

In the liquid crystal layer 401, each display picture element region has at least a first and a second domain (region) having mutually different liquid crystal molecule orientations. The phase difference compensating elements 407a to 409b, in a state where no voltage is applied, compensate for the refractive index anisotropy of the liquid crystal molecules aligned substantially parallel to the surfaces of the first and second substrates 400a and 400b.

The liquid crystal display apparatus 40 of this embodiment is of the type that provides a wide viewing angle. In this apparatus, as compared with a twisted nematic mode construction, the light passing through spherical spacers is large in quantity. This allows the advantage of the invention to become more evident.

In this embodiment, the color filters 402 are of three colors of red, green, and blue. The spherical spacers 406 are placed only in the blue- and red-color regions, and are not placed in the green-color region, or are placed slightly therein, if any.

(Embodiment 3)

Next, a description will be given below as to, as still another embodiment, a liquid crystal display apparatus with a wide viewing angle to which the invention is applied. Note that a manufacturing method therefore is similar to that adopted in the embodiments 1 and 2 and thus the description thereof will be omitted.

Figure 5:
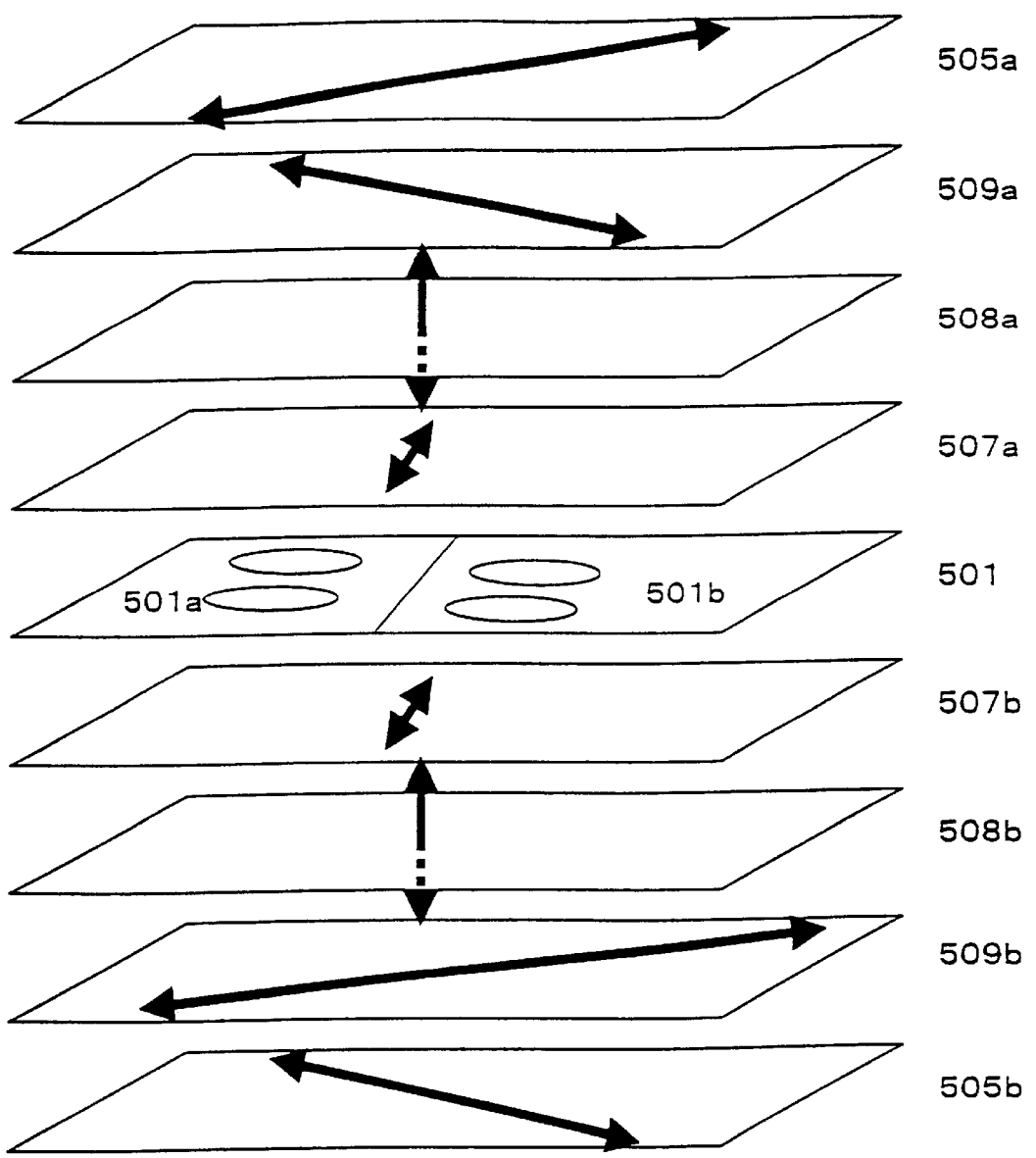
FIG. 5 is a view showing the optical characteristics of the invention.

The optical characteristics of this embodiment will be concretely described with reference to FIGS. 4 and 5. Elliptic figures depicted in FIG. 5 schematically represent liquid crystal molecules, and arrows represent the axis (retardation axis having the maximum refractive index) for the ellipsoid of refractive index of each phase difference plate (each has positive optically uniaxial characteristics). Arrows observed in the polarizing plates 505a and 505b represent the polarization axis (the transmission axis) of the polarizing plate.

As shown in FIG. 5, in the liquid crystal layer 501, each display picture element region has a first domain 501a and a second domain 501b that have mutually different orientation states. In the example shown in FIG. 5, of the liquid crystal molecule within the first domain 501a and the liquid crystal molecule within the second domain 501b have their directors oriented at azimuth angles different from each other by 180 degrees. Accordingly, when a voltage is applied between the electrodes, the liquid crystal molecules within the first domain 501a stand up in a clockwise direction, and the liquid crystal molecules within the second domain 501b stand up in a counterclockwise direction. That is, the orientations of the liquid crystal molecules are so controlled that the liquid crystal molecules within one domain and those within the other domain stand up in different directions. Such orientations of liquid crystal molecule directors can be realized by means of well-known techniques using an orientation film.

By forming a plurality of the first and second domains having director orientation directions 180 degree different form each other in a single display picture element region, it is possible to make the visual angle characteristics uniform more satisfactorily. Note that the division of orientation need not be limited to two-division orientation. It is essential only that, in the entire display area in a voltage-applied state, the sum of the areas of the regions where liquid crystal molecules stand up in one direction be equal to the sum of the areas of the regions where the same stand up in the other direction. In consideration of evenness in the display, it is preferable to make the unit for the division of orientation as small as possible. Specifically, it is preferable that the orientation is divided into two or more portions in each pixel region.

The phase difference plates 507a and 507b each have positive uniaxial refractive index anisotropy. The retardation axis (indicated by the arrows in the figure) thereof is arranged orthogonal to the retardation axis of the liquid crystal layer 501 in a state where no voltage is applied. This arrangement helps prevent occurrence of light leakage due to the refractive index anisotropy exerted by the liquid crystal molecules in a state where no voltage is applied, and consequently, black display (normally black characteristics) is obtained. Note that the black display can also be obtained by using one of the two phase difference plates 507a and 507b.

The phase difference plates 508a and 508b each have positive uniaxial refractive index anisotropy. The retardation axis (indicated by the arrows in the figure) thereof is arranged perpendicular to the surface of the substrate, i.e., perpendicular to the retardation axes of the liquid crystal layer 501 and the phase difference plates 507a and 507b. These phase difference plates compensate for variation in the transmittance due to the change of the visual angle, and, during the black display in particular, suppress light leakage accompanied by the change of the visual angle (the blurred black tone). Accordingly, by providing the phase difference plates 508a and 508b, a liquid crystal display apparatus can be realized that offers more excellent visual angle characteristics. Note that the phase difference plates 508a and 508b do not necessarily have to be provided, or it is also possible to use only one of them to achieve the desired effect.

The phase difference plates 509a and 509b each have positive uniaxial refractive index anisotropy. The retardation axis (indicated by the arrows in the figure) thereof is arranged orthogonal to the polarization axis of the polarizing plate i.e., arranged at 45° with respect to the retardation axes of the liquid crystal layer 501 and the phase difference plates 507a and 507b. These phase difference plates compensate for the rotation of the polarization axis of elliptically polarized light. Accordingly, by providing the phase difference plates 509a and 509b, display with more excellent visual angle characteristics can be realized. Note that the phase difference plates 509a and 509b do not necessarily have to be provided, or it is also possible to use only one of them to achieve the desired effect.

The above stated phase difference plates do not necessarily have to have uniaxial refractive index anisotropy but may have positive biaxial refractive index anisotropy. Moreover, a planarizing film for planarizing the color filter, a light-shielding mask, or the like may be additionally provided within the liquid crystal display apparatus 40.

This embodiment is so designed that the spherical spacers 406 are placed only in the blue- and red-color regions and are not placed in the green-color region, or are placed therein slightly, if any, otherwise they are placed only in the red-color region.

Moreover, as described above, in the embodiment, due to the normally black characteristics of compensating for the refractive index anisotropy of liquid crystal molecules as observed in a state where no voltage is applied, a spherical spacer with no phase difference allows transmission of light, and therefore the light leakage due to the spherical spacer occurring in the blue- and red-regions becomes notable. As a result, the degree of the degradation of contrast becomes greater compared to that observed in a twisted nematic mode construction. Accordingly, with the present invention, the construction with a wide viewing angle of the embodiment, in contrast to a common twisted nematic mode construction which provides a 10% improvement in contrast, provides twice the contrast ratio. Further, as compared with a common twisted nematic mode construction, a liquid crystal display apparatus with a wide viewing angle employs a larger number of phase difference films and thus tends to suffer from a bluish tint. In the embodiment, however, by placing spherical spacers only in the red-color region, it is possible to satisfactorily suppress a bluish tint occurring in the black display and thus improve the display quality significantly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
   a first and a second substrate, of which at least one is transparent;
   color filters of a plurality of colors formed on at least one of the substrates;
   a spacer for defining a gap between the first and second substrates,
   wherein a density of spacers existing in a color filter region of any one of the colors is lower than a density of spacers existing in a color filter region of at least one of remaining colors.

2. A liquid crystal display apparatus comprising:
   a first and a second substrate, of which at least one is transparent;
   a color filter of a plurality of colors formed on at least one of the substrates;
   a liquid crystal layer contained between the first and second substrates; and
   a spacer for defining a gap between the first and second substrates,
   wherein, in the liquid crystal layer, display picture element regions have at least two regions which have mutually different liquid crystal molecule orientations,
   and wherein a density of spacers existing in a color filter region of any one of the colors is lower than a density of spacers existing in a color filter region of at least one of remaining colors.

3. The liquid crystal display apparatus of claim 1,
   wherein a density of spacers existing in a color filter region of a color having higher visibility for human eyes is lower than a density of spacers existing in a color filter region of a color having lower visibility for human eyes.

4. The liquid crystal display apparatus of claim 2,
wherein the density of spacers existing in the color filter region of a color having higher visibility for human eyes is lower than the density of spacers existing in the color filter region of a color having lower visibility for human eyes.

5. The liquid crystal display apparatus of claim 1, wherein the color filters are of three colors: red, green, and blue, and a density of spacers existing in a color filter region of green-color is lower than a density of spacers existing in a color filter region of red- or blue-color.

6. The liquid crystal display apparatus of claim 2, wherein the color filters are of three colors: red, green, and blue, and a density of spacers existing in a color filter region of green-color is lower than a density of spacers existing in a color filter region of red- or blue-color.

7. The liquid crystal display apparatus of claim 1, wherein the color filters are of three colors: red, green, and blue, and a density of spacers existing in a color filter region of green- or blue-color is lower than a density of spacers existing in a color filter region of red-color.

8. The liquid crystal display apparatus of claim 2, wherein the color filters are of three colors: red, green, and blue, and a density of spacers existing in a color filter region of green- or blue-color is lower than a density of spacers existing in a color filter region of red-color.

* * * * *